United States Patent [19]

Barner, Jr. et al.

[11] Patent Number: 4,507,779
[45] Date of Patent: Mar. 26, 1985

[54] MEDIUM SPEED MULTIPLES DATA

[75] Inventors: Robert P. Barner, Jr., Rockville; William M. Durham, Wheaton, both of Md.

[73] Assignee: IBM Corporation, Armonk, N.Y.

[21] Appl. No.: 460,960

[22] Filed: Jan. 25, 1983

Related U.S. Application Data

[63] Continuation of Ser. No. 265,002, May 19, 1981, abandoned.

[51] Int. Cl.³ .............................................. H04J 3/06
[52] U.S. Cl. .................................. 370/100; 370/105; 375/106; 375/110; 371/47
[58] Field of Search ............... 370/100, 103, 105, 108; 371/42, 46, 47; 375/110, 106, 114, 116

[56] References Cited

U.S. PATENT DOCUMENTS

| | | | |
|---|---|---|---|
| 3,336,467 | 8/1967 | Frey, Jr. | |
| 3,571,794 | 3/1971 | Tong et al. | |
| 3,761,891 | 9/1973 | Markwitz | 371/46 |
| 3,806,647 | 4/1974 | Dohne et al. | |
| 3,898,388 | 8/1975 | Goodwin | 370/100 |
| 4,054,754 | 10/1977 | Nicodemus et al. | 370/100 |
| 4,247,936 | 1/1981 | Hustig | 370/100 |
| 4,271,520 | 6/1981 | Coombes et al. | 371/42 |
| 4,282,600 | 8/1981 | Zemanek | 370/100 |
| 4,316,284 | 2/1982 | Howson | 370/105 |
| 4,397,020 | 8/1983 | Howson | 375/116 |
| 4,404,676 | 9/1983 | DeBenedictis | 375/110 |
| 4,425,645 | 1/1984 | Weaver et al. | 375/106 |
| 4,466,099 | 8/1984 | Meltzer | 375/110 |

FOREIGN PATENT DOCUMENTS 39150 7/1981 European Pat. Off. .

OTHER PUBLICATIONS

Review of the Electrical Communication Laboratory, NTT, vol. 17, No. 5-6, May-Jun. 1969, pp. 349-361, D. Kumagai, et al., "PCM-16M System," p. 350, left-hand column, .2.(2): Group Translating Equipment Using Pulse Stuff Synchronization, p. 354, left-hand column, first paragraph.

Primary Examiner—Gerald L. Brigance
Attorney, Agent, or Firm—John E. Hoel

[57] ABSTRACT

Synchronization can be acquired between a transmitting node and a receiving node on a time division multiple access communication link without the necessity for additional data bits in the data stream, by correlating the number of errors detected in any interval as revealed by the forward error correction field. Both synchronization bits and stuffing bits can be located without using any external frame timing information. Substantial bandwidth savings is achieved by the technique, which can be applied for arbitrary combinations of the number of input ports, the number of data bits per group, and the number of parity bits generated per group.

20 Claims, 13 Drawing Figures

FIG. 4
PATTERN GENERATOR

FIG. 7
DELAY 16

FIG. 9
DETECTOR 22

FIG. 11 THRESHOLD CIRCUIT 30

FIG. 5 OUTPUT FROM PATTERN GENERATOR 10

FIG. 6 ENCODER DATA SHIFT REGISTER AND PARITY GENERATOR (6)

FIG. 10 SYNDROME SHIFT REG. 28

FIG. 12 PATTERN GEN. 24

FIG. 13 STUFF BIT LOCATOR

MEDIUM SPEED MULTIPLES DATA

This is a continuation of application Ser. No. 265,002 filed May 19, 1981, now abandoned.

FIELD OF THE INVENTION

The invention disclosed broadly relates to communications and more particularly relates to the acquisition of synchronization in a time division multiple access communication link.

BACKGROUND OF THE INVENTION

In conventional time division multiple access communication networks, the acquisition of synchronization by a slave station from a reference station is generally provided by including separate synchronization patterns in the control messages broadcast from the master station. These separate synchronization patterns can occupy a substantial bandwidth in the overall data transmission stream.

Several attempts have been made in the prior art to incorporate synchronization codes in the data stream. For example, R. A. Scholtz, "Codes with Synchronization Capability," *IEEE Transactions on Information Theory*, Volume IT-12, No. 2, April 1966, pages 135–142 discloses synchronizable codes having the property that the punctuation at a given position in a code symbol stream can be determined by observing other code symbols in the neighborhood of the position in question. The Scholtz technique however still has the drawback that specific and unique synchronization bit patterns are present in the data stream. Other attempts have been made in the prior art to achieve frame synchronization in a TDMA transmission network, wherein a frame synchronizer identifies the framing bits in a serial data stream by examining all of the bits in the frame simultaneously and comparing corresponding bits in adjacent frames for the pattern indicative of a framing bit. This type of prior art system includes a frame bit detector and a circuit for producing a locally originated signal at the estimated time of arrival of the frame bits, and further includes a comparison circuit to indicate the loss of synchronization when an accumulated count of the locally originated signal exceeds the accumulated count of the detected frame bits, by a predetermined threshold. This approach, however, also suffers the drawback that additional data bits in the data stream must be employed. Still other attempts have been made in the prior art to achieve synchronization by searching for a special sequence of bits having an auto correlation impulse pattern. These techniques also suffer from the defect that additional, independent bits must be included in the data stream to enable the acquisition of synchronization.

OBJECTS OF THE INVENTION

It is therefore an object of the invention to provide an improved technique for acquiring synchronization in a time domain multiple access communication network.

It is still another object of the invention to provide an improved technique for identifying stuffing bits in the data stream of a time division multiple access communication network.

It is yet a further object of the invention to provide a method for acquiring synchronization in a TDMA communication system without the necessity of adding independent synchronization bits in the data stream.

It is still a further object of the invention to provide an improved TDMA communication system in which separate identifying bits need not be included in the data stream in order to locate stuffing bits therein.

SUMMARY OF THE INVENTION

These and other objects, features and advantages of the invention are accomplished by the communication apparatus disclosed herein. Synchronization can be acquired between a transmitting node and a receiving node on a time division multiple access communication link without the necessity for additional data bits in the data stream, by correlating the number of errors detected in any interval as revealed by the forward error correction field. Both synchronization bits and stuffing bits can be located without using any external frame timing information. Substantial bandwidth savings is achieved by the technique, which can be applied for arbitrary combinations of the number of input ports, the number of data bits per group, and the number of parity bits generated per group.

DESCRIPTION OF THE FIGURES

These and other objects, features and advantages of the invention will be more fully appreciated with reference to the accompanying figures.

DISCUSSION OF THE PREFERRED EMBODIMENT

The invention is the acquisition of synchronization between a transmitting node and a receiving node on a time division multiple access communication link without the necessity for additional data bits in the data stream by correlating the number of errors detected in any interval as revealed by the forward error correction field.

Figure 1:
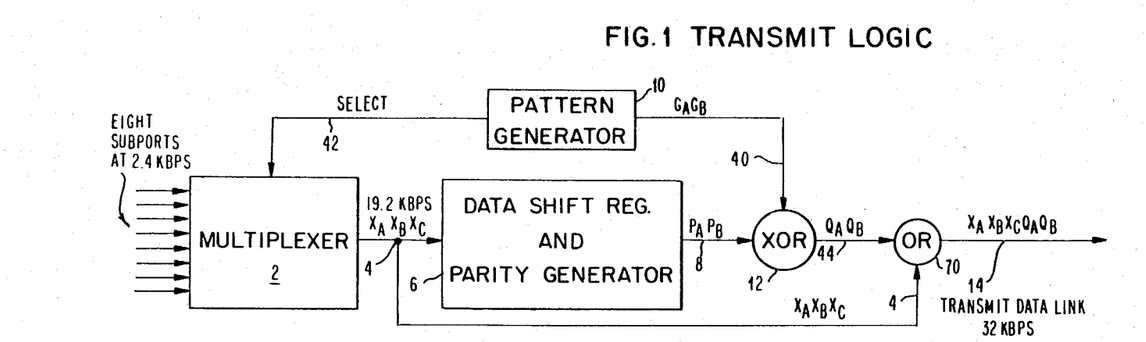
FIG. 1 is a functional block diagram of the transmit logic in the synchronization acquisition mechanism located at the transmitting node, in accordance with the invention.
Figure 2:
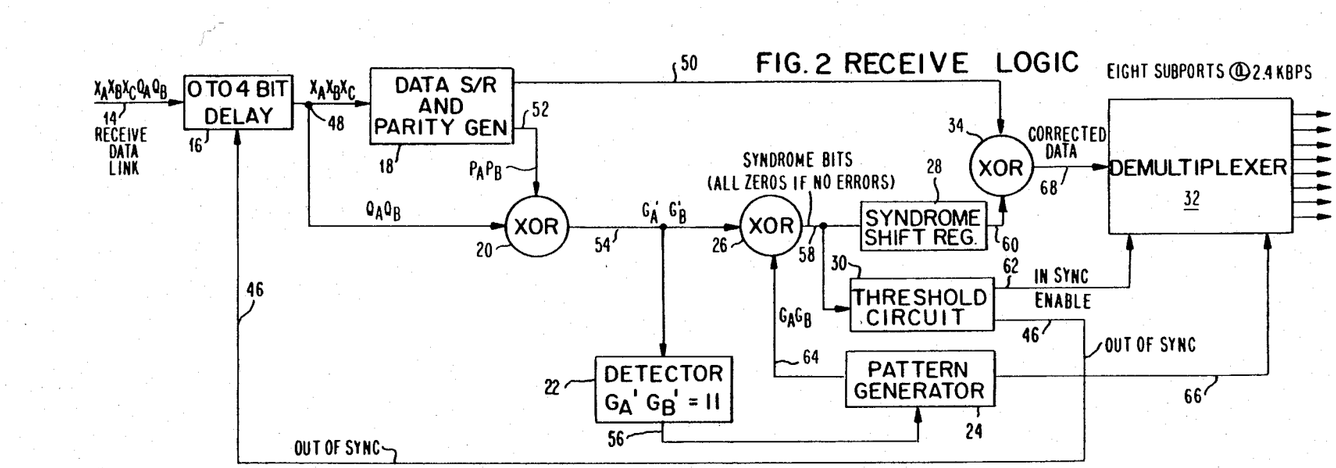
FIG. 2 is a functional block diagram of the receive logic in the synchronization acquisition mechanism located at the receiving node, in accordance with the invention.
Figure 3:
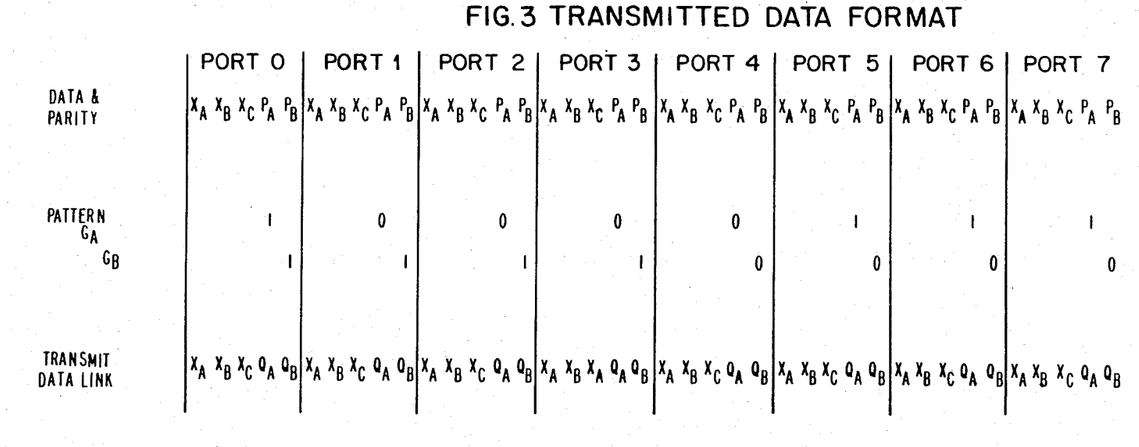
FIG. 3 illustrates the bit format and signal pattern for the error correction bits transmitted from the transmitting node to the receiving node.

The mechanism for performing the synchronization with error correction bits is the transmission logic circuit shown in FIG. 1 and the reception logic circuit shown in FIG. 2. Eight input ports are connected to the transmission logic circuit and, for the present illustration, each operates at 2400 bits per second. The multiplexer 2 outputs onto the local output line 4 at 19.2 Kbps, eight groups of three data bits each whose format is shown in FIG. 3. These eight groups of data bits are input to the parity generator 6, shown in greater detail in FIG. 6, which generates two parity bits on line 8 for each three data bit group on line 4, yielding eight groups of five bits each on the local output line 14 from the OR 70. The parity generator 6 can be a conventional forward error correction (FEC) encoder.

Figure 4:
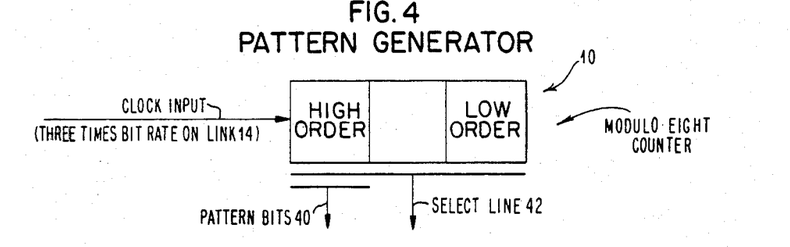
FIG. 4 is a functional block diagram of the pattern generator 10.
Figure 5:
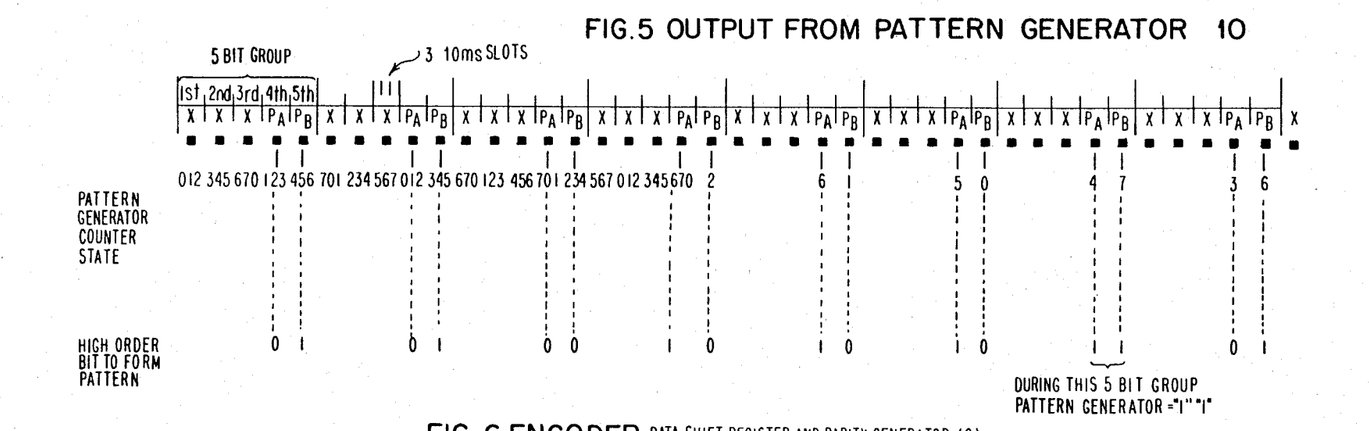
FIG. 5 illustrates the bit timing for the pattern generator 10.

The pattern generator 10, shown in greater detail in FIGS. 4 and 5, starts each frame of eight groups of five bits each by outputting a select signal on line 42 to the multiplexer 2 and outputting a unique pair of bits $G_A$ $G_B$ on line 40 for the first group. The unique value of $G_A$ $G_B$, which in this illustration is 11, is exclusive OR'ed in the exclusive OR circuit 12 with the two parity bits $P_A$ $P_B$ of the first group on line 8, yielding two exclusive OR product bits $Q_A$ $Q_B$ on line 44. The data pattern output on the TDMA communication link 14 for each five-bit group is $X_A$ $X_B$ $X_C$ $Q_A$ $Q_B$.

Other non-unique values of $G_A$ $G_B$ are exclusive OR'ed with the corresponding Pa Pb in the other groups of the frame. This pattern goes out on the link 14.

Figure 7:
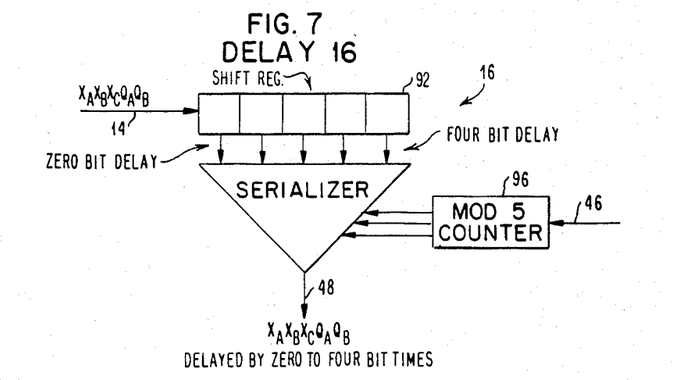
FIG. 7 is a functional block diagram of the digital delay 16.

At the receiver as shown in FIG. 2, the link 14 is input to the digital (single bit position incrementing) shifter 16 shown in greater detail in FIG. 7. The location of the beginning of the frame in the input data stream on link 14 is arbitrarily assumed. The assumed bits "$Q_A$ $Q_B$" on line 48 are then stripped away from each assumed group and exclusive OR'ed in exclusive OR 20 with the locally predicted value of "$P_A$ $P_B$" output on line 52 which is predicted from the assumed values of "$X_A$ $X_B$ $X_C$" which are decoded in the parity generator 18. The parity generator 18 is shown in more detail in FIG. 8. The parity generator 18 may be a conventional FEC decoder. This yields assumed values for "$G_A$ $G_B$" at the output 54 of the exclusive OR 20. If the assumption of the location of the beginning of the eight group frame was correct, then $G_A$ $G_B$ has the value 11 for the first group. The detector 22, shown in more detail in FIG. 9, has an input connected to the output 54 of the exclusive OR 20 and searches for the value 11 for $G_A$ $G_B$ and when that pattern is detected, an enabling signal is sent on line 56 to the receive pattern generator 24. This enabling signal at the pattern generator 24, shown in more detail in FIG. 12, initializes the generator 24 so that it commences generating two values of $G_A$ $G_B$ on line 64, beginning with 11 which is synchronous with the assumed beginning of the input data frame.

Figure 10:
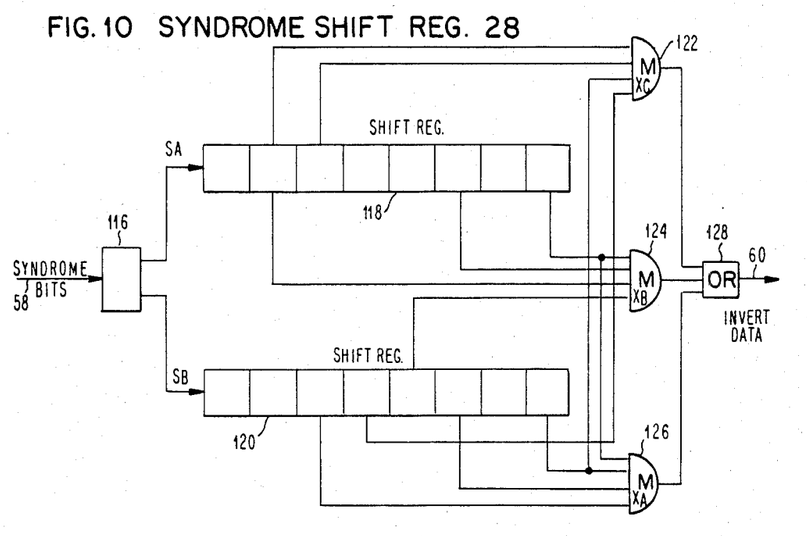
FIG. 10 is a functional block diagram of the syndrome shift register 28.

The output on line 64 of the pattern generator 24 is exclusive OR'ed in exclusive OR 26 with the output on line 54 of the exclusive OR 20. If there has been no random noise on the communication link 14, and if the assumed frame boundary is correct, then the output on line 58 of the exclusive OR 26 will be a series of zeros. This is the syndrome bit stream for the parity generator (FEC decoder) 18 which is used in the conventional manner to correct the data by means of the syndrome shift register 28. A more detailed view of the syndrome shift register 28 is shown in FIG. 10.

The exclusive OR 34 has a first input on line 50 from the parity generator 18 for receiving the uncorrected data bits which are to be exclusive OR'ed with the invert data bits output on line 60 from the syndrome shift register 28. The corrected data is output on line 68 from the exclusive OR 34 to the demultiplexer 32.

Figure 11:
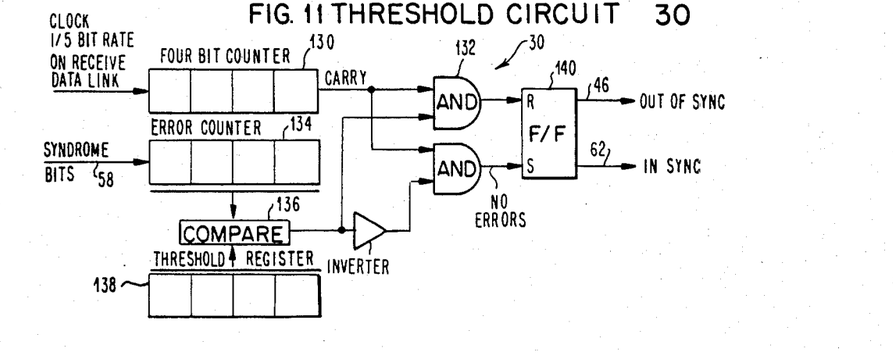
FIG. 11 is a functional block diagram of the threshold circuit 30.

Since random noise events on the communication link 14 will never be eliminated, the threshold circuit 30, shown in more detail in FIG. 11, is provided to monitor the syndrome bits output on line 58 from the exclusive OR 26. If fewer than a low threshold number W of ones is detected over a predetermined number of data frames, then an "in sync state" is achieved and an enabling signal is output on line 62 from the threshold circuit 30 to the receive demultiplexer 32, enabling the corrected values of $X_A$ $X_B$ $X_C$ output on line 68 from the exclusive OR 34 to be distributed among the eight subports output from the demultiplexer 32. The pattern generator 24 provides a synchronized select signal on line 66 to the demultiplexer 32. The absence of an out-of-sync signal on line 46 from the threshold circuit 46 locks the digital shifter 16 and enables a higher tolerance Y of ones from the syndrome stream on line 58.

After synchronization has been achieved, and the higher tolerance Y occurs in the threshold circuit 30, the syndrome shift register 28 and the correction circuit including exclusive OR 34 correct $X_A$ $X_B$ $X_C$ as necessary and send the values on line 68 to the demultiplexer 32. However, if an acute random noise incident occurs, the syndrome ones on line 58 will be greater than the value Y, which is detected by the threshold circuit 30. The circuit 30 resets the threshold to the value W and increments the digital shifter 16 by unity position by means of the out-of-sync signal on line 46, since it is assumed that synchronization has been lost. The operation will therefore continue in the search mode until the detector 22 detects another $G_A$ $G_B$=11 condition on line 54 and the threshold circuit 30 determines that the number of one bits on the syndrome stream on line 58 is less than W.

The pattern generator 10 must produce the sequence of values $G_A$ and $G_B$ on line 40 so they appear at the first input to the exclusive OR 12 at the same time that the parity bits $P_A$ and $P_B$ arrive from the parity generator 6. This pattern must be a sequence of two binary bits which are produced for every five-bit group to be transmitted over the data link 14 and the two pattern bits must periodically assume the unique combination of 11 once in every eight of the five-bit groups. For this example, this pattern generation can be achieved by a pattern generator 10 which is a modulo 8 counter having three binary bit locations, as is shown in FIG. 4. The pattern generator 10 is incremented at a rate which is three times faster than the bit rate to be produced by the five-bit group output on the data link 14. The high order bit is sampled by line 40 once in every three increments of the counter which corresponds to once for every bit period of a five-bit group. In this example, the middle increment in each three increments of the counter in the pattern generator 10 is used as the sampling interval for sampling the high order bit on line 40. This is illustrated by the sequence shown in FIG. 5. It can be shown by inspection that the resulting pattern or $G_A$ $G_B$ for sequence of eight of the five-bit groups is 01, 01, 00, 10, 10, 10, 11, 01, as is shown in FIG. 5. This sequence is periodic and the unique occurrence of the pattern 11 can be employed as the synchronization signal for the sequence of the five-bit groups transmitted over the data link 14. As was described above, the pattern bits $G_A G_B$ on line 40 are exlusive OR'ed with the parity bits $P_A P_B$ on line 8, in the exclusive OR 12 and the resulting bits $Q_A Q_B$ are transmitted along with the corresponding three data bits $X_A X_B X_C$ and are transmitted over the data link 14.

The three binary bits in the counter of the pattern generator 10 can be used as select lines to the multiplexer 2 over the line 42, as described above.

In the transmit logic of FIG. 1, as a result of the select signals on line 42 from the pattern generator 10, the multiplexer 2 multiplexes the eight subports which are each input at a rate of 2.4 Kbps, onto the output line 4 of the multiplexer 2 at an effective rate of 19.2 Kbps. During each eight unit frame, each subport outputs three bits $X_A X_B X_C$ onto line 4. These three data bits for each subport are input on line 4 to the parity generator 6 to produce a pair of parity bits $P_A P_B$ on the parity generator output line 8. The output of the parity generator 6 on line 8 is input as a first input to the exclusive OR 12. The pattern $G_A G_B$ output from the pattern generator 10 on line 40 is input as a second input to the exclusive OR 12. The output of the exclusive OR 12 is the exlcusive OR'ed values $Q_A Q_B$ on line 44 which is input to the OR circuit 70. The other input to the OR circuit 70 is the three data bits $X_A X_B X_C$ on line 4 and the output of the OR circuit 70 is the five bits $X_A X_B X_C Q_A Q_B$ for each of the eight subports, as an output data stream on a transmit data link 14.

The pattern generator 10 is shown in the preferred embodiment as a modulo 8 counter which is incremented by a clock having a rate which is three times the bit rate of the data output on the transmit data link 14. However, other types of pattern generators could be employed, for example a read-only storage (ROS) whose input is periodically clocked and whose output is the desired pattern to be produced on line 40.

Figure 6:
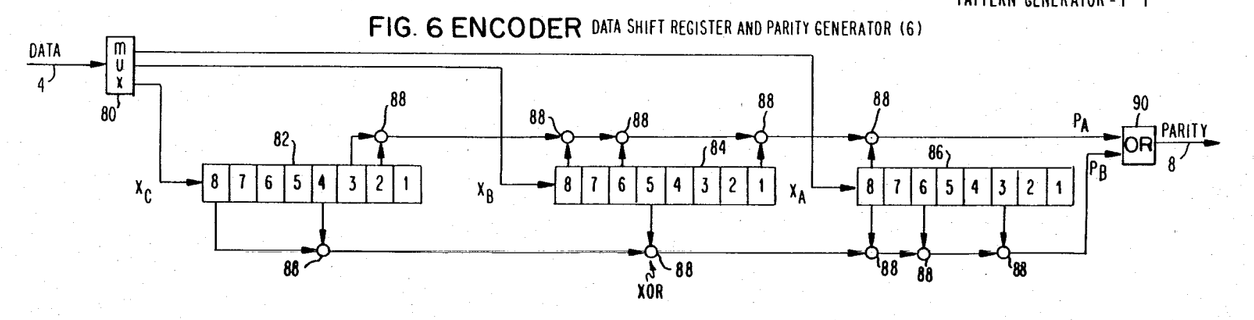
FIG. 6 is a functional block diagram of the data shift register and parity generator 6.

In the transmit logic, the parity generator 6 is shown in greater detail in FIG. 6 wherein the following parity equations are used to generate the two parity bits $P_A P_B$ from the data bits $X_A X_B X_C$. X denotes the data bits and P denotes the parity bits. The subscript n denotes the five-bit group to which the bits belong. The subscripts A, B or C designate the position of the bit within the group.

$P_{An} = X_{An} + X_{Bn} + X_{Bn-2} + X_{Bn-7} + X_{Cn-5} + X_{Cn-6}$ $P_{Bn} = X_{An} + X_{An-2} + X_{An-5} + X_{Bn-3} + X_{Cn} + X_{Cn-4}$

The parity generator of FIG. 6 is a conventional design wherein the data $X_A X_B X_C$ is input on line 4 to the multiplexer 80 and then $X_C$ is distributed to the input of the shift register 82, $X_B$ is distributed to the input of the register 84, and $X_A$ is distributed to the input of the shift register 86. Selective bit locations in each of the shift registers 82, 84, and 86 are output to respective exclusive OR circuits 88 shown in FIG. 6, whose outputs are ultimately input as the parity bits $P_A P_B$ to the OR circuit 90. The output of the OR circuit 90 is the line 8 which is input to the exclusive OR 12, as is shown in FIG. 1.

Turning now to the receive logic, the receive data link 14 carrying the sequence of bits $X_A X_B X_C Q_A Q_B$ for each of the eight subports on a periodic interleaved basis, is input to the digital delay circuit 16, which is shown in greater detail in FIG. 7. The delay 16 has the capability to phase shift the incoming data from zero to four bit times in order to align the five-bit group with the receive logic. The receive data link line 14 is input to the shift register 92 which is a five position shift register, each of whose bit fields has a separate output to the input of the serializer 94. The mod 5 counter 96 has a control input 46 which is the out of sync signal line from the threshold circuit 30, shown in FIG. 2. The mod 5 counter 96 will selectively output the bits at a given output position on the shift register 92, depending upon the value output from the mod 5 counter 96 to the serializer 94. Once set, the mod 5 counter 96 remains at its value as long as the port remains synchronized. After the mod 5 counter is correctly set, a constant phase shift or delay is imposed upon data received from the receive data link 14 and passed through the serializer 94 to the output line 48.

Figure 8:
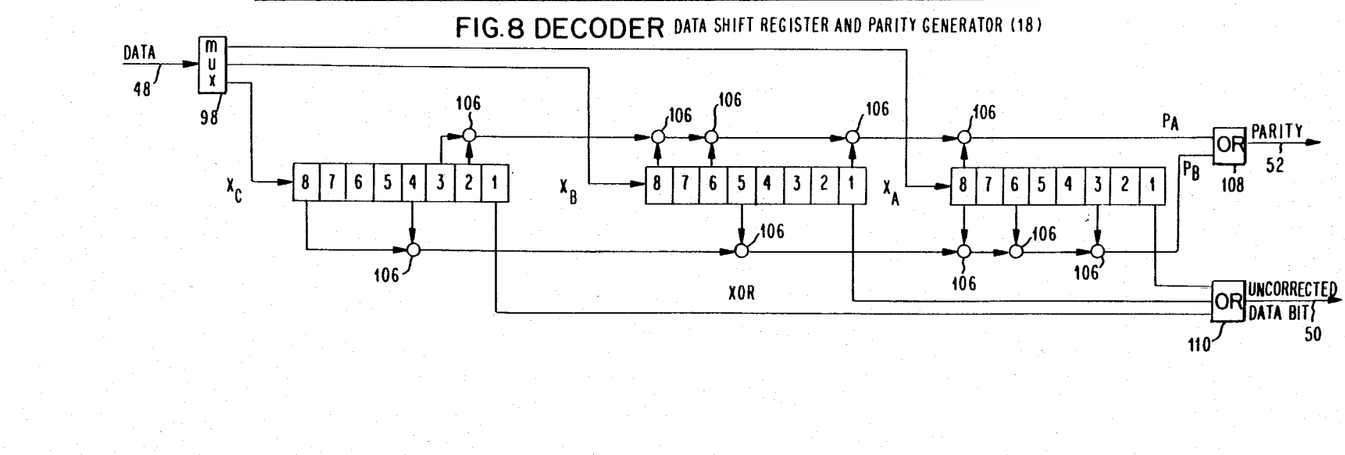
FIG. 8 is a functional block diagram of the data shift register and parity generator 18.

The line 48 is input to the parity generator 18 which is shown in greater detail in FIG. 8. Line 48 is input to the multiplexer 98 which distributes the value $X_C$ to the input of the shift register 100, and value $X_B$ to the input of the shift register 102, and the value $X_A$ to the input of the shift register 104. Selected bit fields in each of the shift registers 100, 102 and 104 have their outputs connected to exclusive OR circuits 106, as is shown in FIG. 8. The outputs of the exclusive OR circuits 106 are ultimately input to the OR circuit 108 as the parity bits $P_A P_B$. The output of the OR circuit 108 is the line 52 which is input to the exclusive OR 20 in FIG. 2. The bit position 1 of each of the shift registers 100, 102 and 104 is output to the OR circuit 110 which outputs on line 50 the data bits $X_A X_B X_C$ to the exclusive OR circuit 34, as is shown in FIG. 2.

Figure 9:
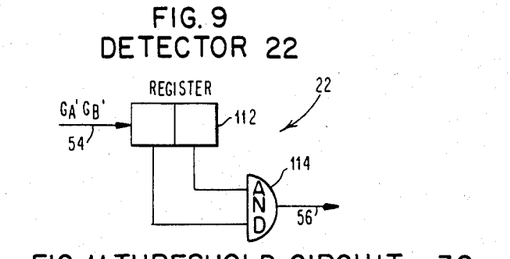
FIG. 9 is a functional block diagram of the detector 22.

The values $Q_A Q_B$ on the line 48 from the delay 16 are input to the exclusive OR circuit 20 and are exclusive OR'ed with the parity bits $P_A P_B$ so as to generate the product bits $G'_A G'_B$ on line 54. $G'_A G'_B$ are then input to the detector circuit 22, which is shown in greater detail in FIG. 9. The function of the detector circuit 22 is to output an enabling signal on line 56 to the pattern generator 24 when the pair of binary bits 11 for the product $G'_A G'_B$ is detected, corresponding to a synchronization signal for the data stream input on the receive data line 14. As is seen in FIG. 9, the detector 22 has a two-bit register 112 whose input is connected to the line 54, for storing the values $G'_A G'_B$ in the two respective bit fields. The output of each respective bit field is input as one of the two inputs to a two input AND circuit 114, whose output is the enable line 56. When $G'_A = G'_B$, the AND function in the AND circuit 114 is satisfied, and an enabling signal is output on line 56 to the pattern generator 24, as is shown in FIG. 2.

Line 54 output from the exclusive OR 20 inputs the values $G'_A G'_B$ as one input to the exclusive OR 26, whose other input is values $G_A G_B$ input on line 64 from the pattern generator 24. The pattern generator 24 is identical to the pattern generator 10 in the transmit logic, and starts generating the pattern sequence shown in FIG. 5, starting with $G_A G_B = 11$, when an enabling signal is output on line 56 from the detector 22. Thus, if $G'_A G'_B$ accurately correspond to the sequence $G_A G_B$ which was generated by the pattern generator 10 at the transmit node's transmit logic, then the exclusive OR 26 will be operating on two identical inputs and should therefore output syndrome bits on line 58 which are all zeros (if there were no noise errors on the data link 14).

Line 58 from the exclusive OR 26 is input to the multiplexer 116 and the syndrome bits $S_A$ and $S_B$ are respectively input to the shift registers 118 and 120. Selected bit fields in the shift registers 118 and 120 are connected to the AND gates 122, 124 and 126, which constitute a majority block. If more than two bits have a binary value of one from the syndrome shift registers 118 and 120, then the $X_A$, $X_B$ or $X_C$ data bit is corrected. When a correction is made, the corresponding syndrome bits which were involved in the correction are complemented. The OR block 128 outputs the invert data on line 60 to the exclusive OR 34, whose other input is the line 50 which contains the data bits $X_A$ $X_B$ and $X_C$. The resulting correcting data is output from the exclusive OR 34 on line 68 and is input to the multiplexer 32 at an effective data rate of 19.2K bps.

The pattern generator 24 outputs an enabling signal on line 66 to the demultiplexer 32 so as to coordinate the distribution of the correct data bit group on the input line 68 with the corresponding one of the eight subports output from the demultiplexer 32. The pattern generator is shown in detail in FIG. 12.

Since the receive logic has one out of eight chances of actually making the right assumption as to the location of the synchronization signal in the data stream input on the receive data link 14, when nonzero syndrome bits are output on line 58 from the exclusive OR 26, they should indicate a state of non-synchronization. However, any realistic receive data link 14 will incur noise pulses from time to time which will also generate nonzero syndrome bits on line 58 when they occur. Thus, the threshold circuit 30 is provided, as is shown in FIG. 11, to enable the system to tolerate the receipt of noise induced errors up to a preselected threshold level, above which the state of non-synchronization is assumed.

The threshold circuit in FIG. 11 has a four-bit counter 130 with a clock input which increments the four-bit counter 130 at one-fifth the bit rate of the receive data link 14. The four-bit counter will count to a value 15 and then at the next clock pulse, will generate a carry signal to a first input of the two input AND circuits 132. An error counter 34 is also provided and has an input line connected to the syndrome bit line 58 so that the counter 134 counts the number of one bits output from the exclusive OR 26 on the line 58. The value of the count in the counter 134 is output as one input to the compare 136. A threshold register 138 is also provided which stores a predetermined value for the threshold of the number of one bits in the syndrome stream on line 158 which are allowed to occur during any sequence of 16 of the five-bit groups on the receive data link 14 before the out-of-synchronization stage is inferred. The value stored in the threshold register 138 is also output as a second input to the compare 136. If the number of binary one values for the syndrome bits on line 158 which are counted in the error counter 134, exceeds the threshold value stored in the threshold register 138, during any group of 16 of the five-bit groups, then the compare 136 outputs an enable signal to the second input of the two-input AND 132. When the AND circuit 132 is thus satisfied, it will output the signal to the reset input of the flip-flop 140, causing an out-of-sync signal to be produced on line 46 which is input to the delay 16, as previously described. The flip-flop 140 is set when there are no errors.

The four-bit counter 130 is used to count 16 of the five-bit groups. During this time, corrections made to the received data due to link errors are counted. The error counter 134 is used in conjunction with the four-bit counter 130 to determine whether the receive logic is synchronized. The error counter 134 is incremented when corrections are made to the receive data as is determined by the syndrome bits on line 158. For example, the threshold register 138 can be set with a value of three and therefore up to three errors can be tolerated in any one sequence of 16 of the five-bit groups before the comparator 136 outputs a signal indicating that the receive logic has lost synchronization. If the receive logic loses synchronization, as is indicated by a pulse output on line 46 from the flip-flop 140, receive logic automatically attempts to resynchronize by changing the delay duration in the delay 16 so as to search for the proper five-bit boundary. The proper five-bit boundary is considered to have been found if no errors occur during a 16 group trial.

Figure 12:
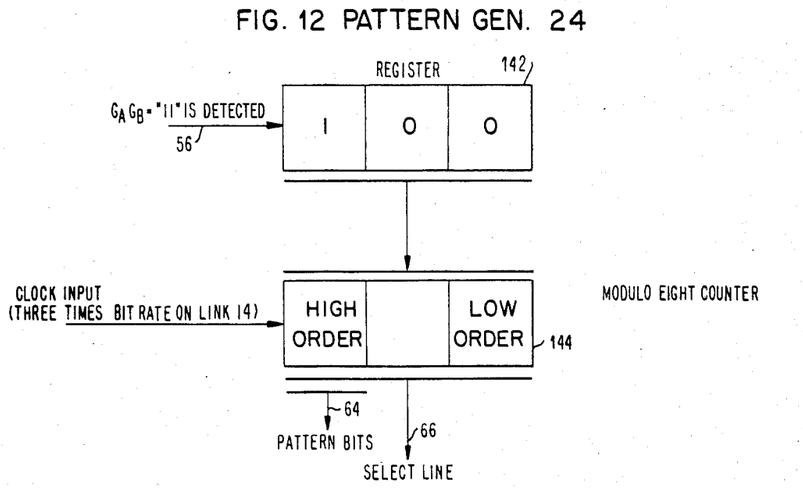
FIG. 12 is a functional block diagram of the pattern generator 24.

The pattern generator 24 is shown in more detail in FIG. 12 and consists of a three bit register 142 and a three bit modulo 8 counter 144. When the detector 22 detects that the value of $G'_A G'_B$ is 11, an enabling signal is output on line 56 and is input to the register 142. This causes the binary number 100 to be loaded into the modulo 8 counter 144. The modulo 8 counter is incremented with a clock input which is three times the bit rate on the link 14. The pattern bits are output from the high order position of the counter 144 once for every three clock input signals. By loading the binary number 100 into the counter 144, the high order value of one is output on line 64 as the value for $G_A$. The clock pulse increments the counter 144 three times to achieve the binary numbers 101; 110; and 111. The last binary number 111 has its high order value of one output on line 64 as the value for $G_B$. The values of $G_A$ and $G_B$ output on line 64 are exclusive OR'ed in the exclusive OR 26 with the corresponding values $G'_A$ $G'_B$, thus starting the sequence of syndrome bits on line 58 for the assumed beginning of a sequence of 16 of the five-bit groups. The counter 144 continues to have its contents incremented by its clock input so that the sequence of values for $G_A$ $G_B$ shown in FIG. 5 are generated. The select line 66 applies selected values in the counter 144 to the demultiplexer 32 to selectively connect the corrected data on line 68 to the desired respective one of the 2.4K bps subports output from the demultiplexer 32.

In an alternate embodiment, the input subports to multiplexer 2 need not have a data rate which is an integral submultiple of the local output line 4, but instead can be a nonintegral submultiple, requiring the occasional insertion of a stuff bit. The invention can be further employed to transmit the location of stuff bits in the data stream by establishing another bit combination of $G_A G_B$ as a second unique pair defining such stuff bit location. Circuitry similar to the synchronization circuitry discussed above, can be employed for this purpose and can operate on the same data stream undergoing synchronization analysis by the above-described circuitry.

Figure 13:
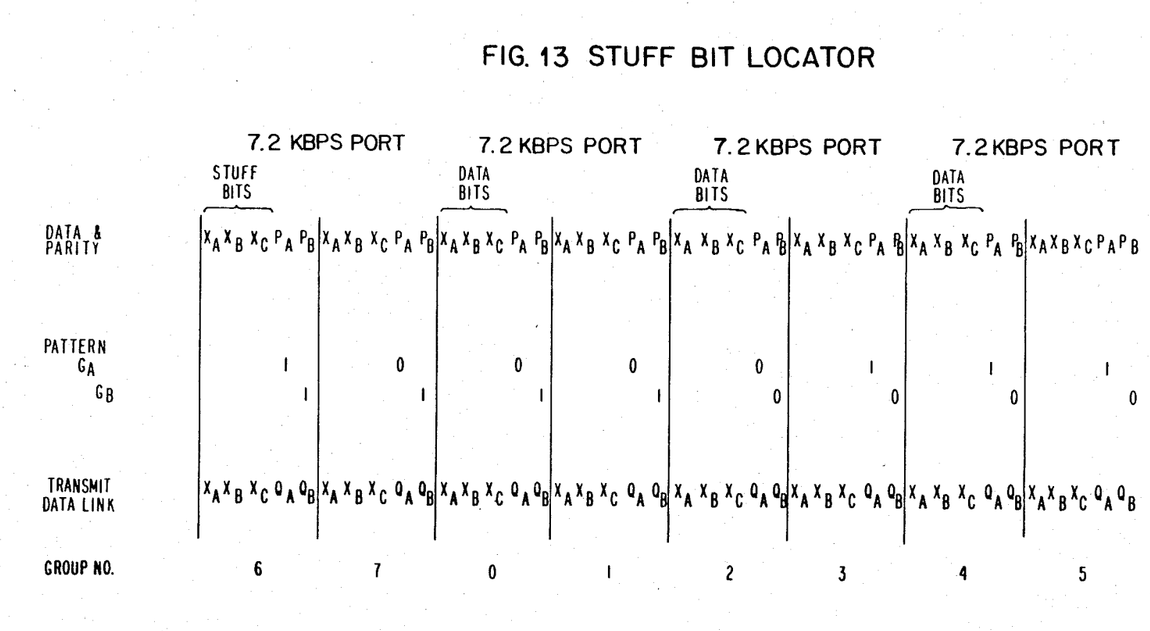
FIG. 13 is a data bit timing diagram for the alternate embodiment of the invention, to determine stuffing bit locations.

As an example of the use of the above-described invention to locate stuffing bits, suppose a subport input to the transmit multiplexer 2 has a speed of 7200 bps and the output of the multiplexer 2 at four is 19.2K bps. The ratio of 7.2K bps to 19.2K bps is three-eighths. In the five-bit groups shown in FIG. 13, data can be sent in every other group, for example the even groups. Three out of every four even groups can have real data bits and the fourth even group can have stuff bits and this will achieve a 7.2K bps effective data rate. As is shown in FIG. 13, the group 0, 2, and 4 have three bits of actual data along with their respective parity bits and the group 6 has three stuff bits along with its respective parity bits. Parity bits in group 6 can have a special significance of having the value 11 so that upon detection in the receive logic, in a manner similar to that described above for the detection of the synchronization signal, the location of the stuff bits in group 6 can be determined.

The total data bits sent per eight of the five-bit groups is nine bits and three stuff bits out of 24 total data bits.

Although a specific embodiment of the invention has been disclosed, it will be understood by those of skill in the art that the foregoing and other changes in form and details may be made therein without departing from the spirit and the scope of the invention.

Having thus described our invention, what we claim is new, and desire to secure by Letters Patent is:

1. A synchronizer for a binary bit stream divided into successive groups of N data bits, comprising:
   a time domain multiplexer at a transmission node having L input ports and outputting L groups of N data bits each to a first parity generator which generates M parity bits for each N bit group, yielding L groups of M+N bits for each frame which are input to a first exclusive OR circuit;
   a first pattern generator in the transmitting node which generates L groups of pattern bits each frame with a unique pattern being generated synchronously with the beginning of each frame, said pattern bits input to a second input of said first exclusive OR to be exclusive OR'ed with respective M bit groups of said parity bits yielding M code bits output from said first exclusive OR and appended to said N data bits in each group producing an M+N group which is transmitted over the TDMA communication link;
   a digital shifter in a receiving node connected to the receiving end of said communication link for selectively delaying the data stream received from said communication link by one bit increments;
   a second parity generator connected to the output of said digital shifter for predicting from assumed values of N data bits per group, an assumed set of M parity bits which are output to the first input of a second exclusive OR circuit, the second input of which receives the corresponding M code bits received over said communication link;
   a unique pattern bit detector having an input connected to the output of said second exclusive OR for detecting said unique pattern;
   a second pattern generator having an enabling input connected to the output of said detector, for commencing the generation of said pattern bits, starting with said unique pattern bits when an enabling pulse is received from said detector;
   a third exclusive OR circuit having a first input connected to the output of said second exclusive OR circuit and a second input connected to the output of said second pattern generator, for generating syndrome bits corresponding to the code bits received from said communication link;
   a threshold circuit having an input connected to the output of said third exclusive OR circuit, for establishing a low threshold number of ones to be detected from said third exclusive OR circuit and establishing an enabling signal when that threshold condition is determined, corresponding to the correct assumption of the location of the beginning of said frame input from said communication link;
   a bit correcting circuit connected to the output of said third exclusive OR circuit, for correcting indicated ones of said N data bits received from said communication link in response to the output of said third exclusive OR circuit;
   a demultiplexer having an input connected to said correction circuit, an enabling input connected to said threshold circuit, a timing input connected to an output of said second pattern generator, and a plurality of L outputs, for demultiplexing the time multiplexed L groups of N data bits in response to said threshold circuit indicating a synchronized state.

2. The apparatus of claim 1 which further comprises:
   said threshold circuit having a second, higher tolerance threshold value which is selected when said synchronized state is established;
   said threshold circuit detecting when the quantity of ones in said syndrome output from said third exclusive OR circuit exceeds said second threshold value and in response to this detection, resetting the effective threshold to said first threshold value and outputting an increment enable signal to said digital shifter;
   whereby the assumed boundary of the frame is shifted by one unit in a synchronization search mode.

3. The apparatus of claim 2 which further comprises:
   a stuffing bit generator in said transmit node for inserting a data stuffing bit into selected groups of said data bits to accommodate for a mismatch in respective data rates of one of said input lines to said multiplexer and said communication link;
   said stuffing bit generator having an output connected to said first pattern generator, for producing a second unique bit pattern from said pattern generator in response to the insertion of a stuffing bit into said data bits of said selected group;
   a second detector at said receive node having an input connected to the output of said second exclusive OR, for detecting said second unique pattern bits;
   whereby the location of a received stuffing bit may be determined.

4. A synchronizer for a binary bit stream divided into successive groups of N data bits on a time domain multiplexed (TDM) communication link, comprising:
   transmit logic at a transmitting node of said link, comprising:
   a time domain multiplexer having L input ports, for outputting L groups of N data bits each;
   a first parity generator having an input connected to the output of said multiplexer, for generating M parity bits for each N bit group, yielding L groups of M+N bits for each frame;
   a first exclusive OR circuit having an input connected to the output of said first parity generator;
   a first pattern generator for generating L groups of pattern bits each frame with a unique pattern being generated synchronously with the beginning of each frame, said pattern bits being input to a second input of said first exclusive OR to be exclusive OR'ed with respective M bit groups of said parity bits yielding M code bits at the output of said first exclusive OR; and an OR circuit with a first input connected to the output of said multiplexer and a second input connected to the output of said first exclusive OR and an output connected to said communication link, for outputting said M code bits appended to each corresponding group of said N data bits producing an M+N bit group which is transmitted over said TDM communication link;

an receive logic at a receiving node of said link comprising:

a digital shifter connected to the receiving end of said communication link, for selectively delaying the data stream received from said communication link;

a second parity generator connected to the output of said digital shifter for predicting from assumed values of N data bits per group, an assumed set of M parity bits;

a second exclusive OR circuit having a first input connected to the output of said second parity generator and a second input connected to the output of said shifter, to receive said corresponding M code bits received over said communication link;

a unique pattern bit detector having an input connected to the output of said second exclusive OR for detecting said unique pattern;

a second pattern generator having an enabling input connected to the output of said detector, for commencing the generation of said pattern bits, starting with said unique pattern bits when an enabling pulse is received from said detector;

a third exclusive OR circuit having a first input connected to the output of said second exclusive OR circuit and a second input connected to the output of said second pattern generator, for generating syndrome bits corresponding to said M code bits received from said communication link;

a threshold circuit having an input connected to the output of said third exclusive OR circuit, for establishing a low threshold number of ones to be detected from said third exclusive OR circuit and establishing an enabling signal when that threshold condition is determined, corresponding to the correct assumption of the location of the beginning of said frame input from said communication link;

a bit correcting circuit connected to the output of said third exclusive OR circuit, for correcting indicated ones of said N data bits received from said communication link in response to the output of said third exclusive OR circuit;

a demultiplexer having an input connected to said correction circuit, an enabling input connected to said threshold circuit, a timing input connected to an output of said second pattern generator, and a plurality of L outputs, for demultiplexing the time multiplexed L groups of N data bits in response to said threshold circuit indicating a synchronized state.

5. The apparatus of claim 4 which further comprises:
said threshold circuit having a second, higher tolerance threshold value which is selected when said synchronized state is established;
said threshold circuit detecting when the quantity of ones in said syndrome output from said third exclusive OR circuit exceeds said second threshold value and in response to this detection, resetting the effective threshold to said first threshold value and outputting an increment enable signal to said digital shifter;
whereby the assumed boundary of the frame is shifted in a synchronization search mode.

6. The apparatus of claim 5 which further comprises:
a stuffing bit generator in said transmit logic for inserting a data stuffing bit into selected groups of said data bits to accommodate for a mismatch in respective data rates of one of said input lines to said multiplexer and said communication link;
said stuffing bit generator having an output connected to said first pattern generator, for producing a second unique bit pattern from said pattern generator in response to the insertion of a stuffing bit into said data bits of said selected group;
a second detector in said receive logic having an input connected to the output of said second exclusive OR, for detecting said second unique pattern bits;
whereby the location of a received stuffing bit may be determined.

7. A synchronizer for a binary bit stream divided into successive groups of N data bits on a time domain multiplexed (TDM) communication link, comprising:
transmit logic at a transmitting node of said link, comprising:
a time domain multiplexer having L input ports and outputting L groups of N data bits each to a first parity generator which generates M parity bits for each N bit group, yielding L groups of M+N bits for each frame which are input to a first exclusive OR circuit;
a first pattern generator which generates L groups of pattern bits each frame with a unique pattern being generated synchronously with the beginning of each frame, said pattern bits input to a second input of said first exclusive OR to be exclusive OR'ed with respective M bit groups of said parity bits yielding M code bits output from said first exclusive OR and appended to said N data bits in each group producing an M+N bit group which is transmitted over said TDM communication link;
and said receive logic at a receiving node of said link, comprising:
a digital shifter connected to the receiving end of said communication link for selectively delaying the data stream received from said communication link;
a second parity generator connected to the output of said digital shifter for predicting from assumed values of N data bits per group, an assumed set of M parity bits which are output to the first input of a second exclusive OR circuit, the second input of which receives the corresponding M code bits received over said communication link;
a unique pattern bit detector having an input connected to the output of said second exclusive OR for detecting said unique pattern;
a second pattern generator having an enabling input connected to the output of said detector, for commencing the generation of said pattern bits, starting with said unique pattern bits when an enabling pulse is received from said detector;
a third exclusive OR circuit having a first input connected to the output of said second exclusive OR circuit and a second input connected to the output of said second pattern generator, for generating syndrome bits corresponding to the code bits received from said communication link;

a threshold circuit having an input connected to the output of said third exclusive OR circuit, for establishing a low threshold number of ones to be detected from said third exclusive OR circuit and establishing an enabling signal when that threshold condition is determined, corresponding to the correct assumption of the location of the beginning of said frame input from said communication link;

a demultiplexer having an input connected to the output of said digital shifter, an enabling input connected to said threshold circuit, a timing input connected to an output of said second pattern generator, and a plurality of L outputs, for demultiplexing the time multiplexed L groups of N data bits in response to said threshold circuit indicating a synchronized state.

8. The apparatus of claim 7 which further comprises:

said threshold circuit having a second, higher tolerance threshold value which is selected when said synchronized state is established;

said threshold circuit detecting when the quantity of ones in said syndrome output from said third exclusive OR circuit exceeds said second threshold value and in response to this detection, resetting the effective threshold to said first threshold value and outputting an increment enable signal to said digital shifter;

whereby the assumed boundary of the frame is shifted by one unit in a synchronization search mode.

9. The apparatus of claim 8 which further comprises:

a stuffing bit generator in said transmit logic for inserting a data stuffing bit into selected groups of said data bits to accommodate for a mismatch in respective data rates of one of said input lines to said multiplexer and said communication link;

said stuffing bit generator having an output connected to said first pattern generator, for producing a second unique bit pattern from said pattern generator in response to the insertion of a stuffing bit into said data bits of said selected group;

a second detector in said receive logic having an input connected to the output of said second exclusive OR, for detecting said second unique pattern bits;

whereby the location of a received stuffing bit may be determined.

10. A method for synchronizing a binary bit stream on a TDM link, divided into successive groups of N data bits, comprising the steps of:

a multiplexing L input ports at a transmission node and outputting L groups of N data bits each;

generating M parity bits in a first parity generator for each of said N bit groups, yielding L groups of M+N bits for each frame which are input to a first exclusive OR circuit;

generating L groups of pattern bits in a first pattern generator in the transmitting node during each frame with a unique pattern being generated synchronously with the beginning of each frame, said pattern bits input to a second input of said first exclusive OR to be exclusive OR'ed with respective M bit groups of said parity bits yielding M code bits output from said first exclusive OR and appended to said N data bits in each group producing an M+N bit group which is transmitted over the TDM communication link;

generating an assumed set of M parity bits from assumed values of N data bits per group, in a second parity generator at a receiving node and connected to the output of said TDM link, said assumed set being output to the first input of a second exclusive OR circuit, the second input of which receives said corresponding M code bits received over said communication link;

detecting said unique pattern in a unique pattern bit detector having an input connected to the output of said second exclusive OR;

commencing the generation of said pattern bits, starting with said unique pattern bits in a second pattern generator having an enabling input connected to the output of said detector, when an enabling pulse is received from said detector;

generating syndrome bits corresponding to the code bits received from said communication link in a third exclusive OR circuit having a first input connected to the output of said second exclusive OR circuit and a second input connected to the output of said second pattern generator;

establishing a low threshold number of ones to be detected from said third exclusive OR circuit and establishing an enabling signal when that threshold condition is determined in a threshold circuit having an input connected to the output of said third exclusive OR circuit, corresponding to the correct assumption of the location of the beginning of said frame input from said communication link;

demultiplexing the time multiplexed L groups of N data bits in response to said threshold circuit indicating a synchronized state in a demultiplexer having an input connected to said communication link, an enabling input connected to said threshold circuit, a timing input connected to an output of said second pattern generator, and a plurality of L outputs.

11. The method of claim 10 which further comprises:

said threshold circuit having a second, higher tolerance threshold value which is selected when said synchronized state is established;

said threshold circuit detecting when the quantity of ones in said syndrome output from said third exclusive OR circuit exceeds said second threshold value and in response to this detection, resetting the effective threshold to said first threshold value and outputting an increment enable signal to a digital shifter in a receiving node connected to the receiving end of said communication link for selectively delaying the data stream received from said communication link by one bit increments;

whereby the assumed boundary of the frame is shifted by one unit in a synchronization search mode.

12. A synchronizer in a data transmission system for a binary bit stream divided into successive groups of N data bits with a time division multiplexer at a transmitting node having L input ports and outputting L groups of N data bits each to a first parity generator which generates M first parity bits for each N bit group, yielding L groups of M+N bits for each frame, and thus not comprising any additional independent synchronization bits, with a corresponding second parity generator and demultiplexer at the receiving node, and further comprising:

a first pattern generator in the transmitting node which generates first L groups of M pattern bits each frame with a unique group of M pattern bits being generated synchronously with the beginning of each frame, said groups of M pattern bits being logically combined with respective M bit groups of said first parity bits, in a first exclusive OR circuit, yielding M first code bits appended to said N data bits in each group producing an M+N group which is transmitted to the receiving node where said second parity generator generates from N assumed data bits, M second parity bits being logically combined with the assumed M first code bits, in a second exclusive OR circuit to produce M second code bits;

a unique pattern bit detector connected to the output of said second exclusive OR circuit for detecting said unique groups of M pattern bits;

a second pattern generator having an enabling input connected to the output of said detector for commencing the generation of second L groups of M pattern bits being equal to said first groups, upon the detection of said unique groups of M pattern bits;

a third exclusive OR circuit having a first input connected to the output of said second exclusive OR circuit and a second input connected to the output of said second pattern generator for generating syndrome bits whose values are zero if the data bits are received correctly and in synchronization;

and a digital shifter, at the output of the receiving node, being controlled by non-zero syndrome bits to establish synchronization between the transmitted and the received data bits.

13. A synchronizer according to claim 12, which further comprises:
a threshold circuit for counting non-zero syndrome bits and controlling said shifter to delay the received bit stream by one or more bit periods.

14. A synchronizer according to claim 13, wherein the threshold circuit comprises:
an error counter for counting the syndrome bits, whose output is connected to a compare register;
a threshold register for storing a predetermined threshold count value and whose output is connected to the other input of said compare circuit;
a counter for counting clock pulses at 1/(M+N) bit rate and generating a carry signal after a predetermined number of frames;
a latch having its set input connected to a first AND gate and its reset input connected to a second AND gate;
the first inputs of said AND gates being both connected to the carry output of said clock pulse counter;
the output of said compare circuit being connected to the second input of said second AND circuit and via an inverter to the second input of said first AND gate;
such that the latch generates a signal "out-of-synchronization" if the threshold error value has been counted, and generates a signal "in-synchronization" if this value has not been counted, during said predetermined number of frames.

15. A synchronizer according to claim 14, wherein the "in-synchronization" signal is connected to an enabling input of said demultiplexer in the receiving node and in that the "out-of-synchronization" signal is connected to said shifter.

16. A synchronizer according to claim 12, wherein the shifter comprises:
a shift register for selectively delaying the received bit stream by one or more bit periods and whose stage outputs are connected to a serializer;
a modulo (M+N) counter for counting said "out-of-synchronization" signals from said threshold circuit and for selecting one of the outputs of said shift register as output of said shifter.

17. A synchronizer according to claim 14, wherein a high threshold value is loaded into the threshold register if synchronization is lost and a lower threshold value is used if synchronization is re-established.

18. A synchronizer according to claim 12, wherein said first pattern generator comprises:
a modulo L counter incremented by clock pulses at a rate which is N times faster than the bit rate on the transmission line, a pattern bit being taken from the high order stage of said counter every N increments of said counter and during the respective M parity bit periods;
said counter further including a select line to start each frame in said multiplexer upon the occurrence of the unique pattern.

19. A synchronizer according to claim 12, wherein M equals two, N equals three and L equals eight.

20. A synchronizer according to claim 12, for a data transmission system wherein the L subports through the first multiplexer do not have a data rate which is an integral submultiple of the local output line which requires the occasional insertion of a stuff bit, another unique bit combination generated by said pattern generators is employed to transmit the location of stuff bits in the data stream.

* * * * *

UNITED STATES PATENT AND TRADEMARK OFFICE
CERTIFICATE OF CORRECTION

PATENT NO. : 4,507,779
DATED : March 26, 1985
INVENTOR(S) : Robert P. Barner, Jr.  William M. Durham It is certified that error appears in the above-identified patent and that said Letters Patent is hereby corrected as shown below:

On the title page;

IN THE TITLE:

Please change "MULTIPLES" to --MULTIPLEX--.

IN THE CLAIMS:

Col. 11, line 9, change "an" to --and--.

Signed and Sealed this

Thirteenth Day of August 1985

[SEAL]

Attest:

DONALD J. QUIGG

*Attesting Officer*  *Acting Commissioner of Patents and Trademarks*